April 15, 1947. C. S. KING 2,419,147
MANUFACTURE OF SODIUM TRIPOLYPHOSPHATE
Filed Sept. 14, 1942
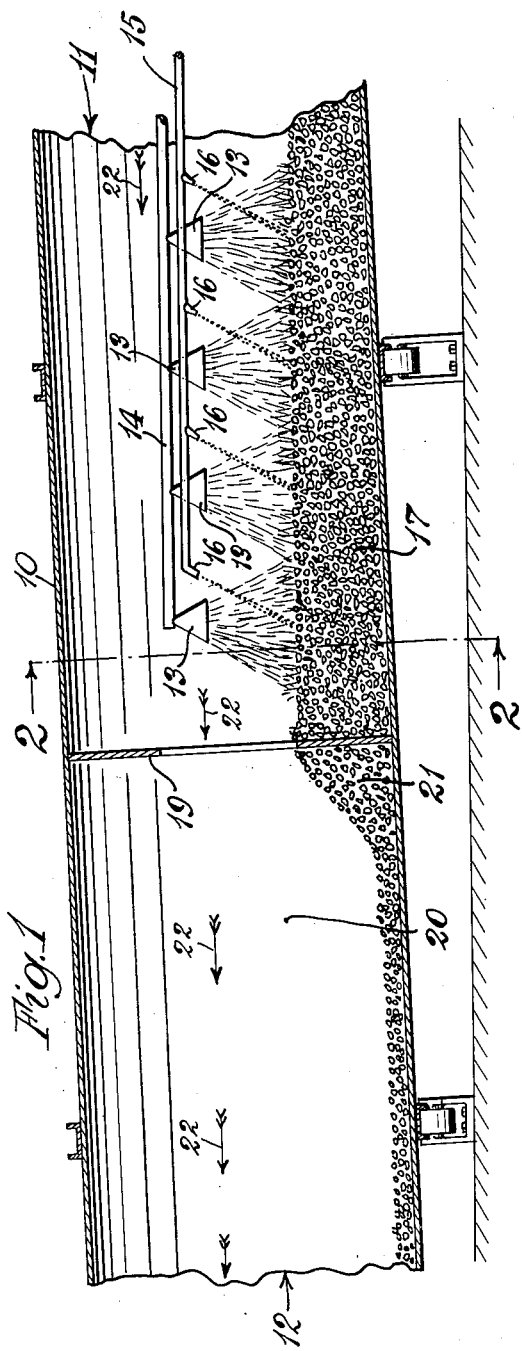
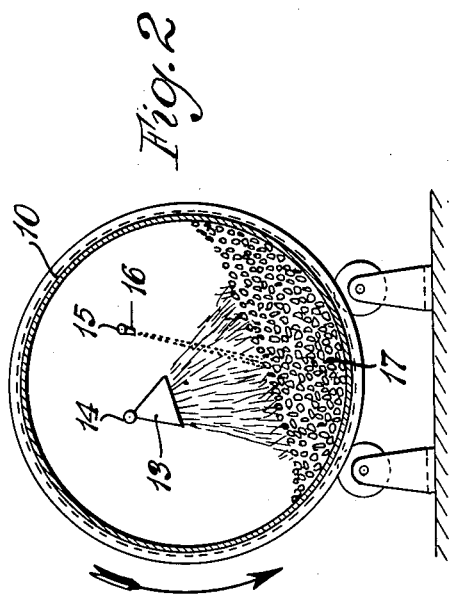
Inventor
Charles S. King
by W. Bartlett Jones,
Attorney.

Patented Apr. 15, 1947

2,419,147

UNITED STATES PATENT OFFICE 2,419,147

MANUFACTURE OF SODIUM TRIPOLY-PHOSPHATE

Charles S. King, Joliet, Ill., assignor to Blockson Chemical Co., Joliet, Ill., a corporation of Illinois Application September 14, 1942, Serial No. 458,201

18 Claims. (Cl. 23—106)

The present invention relates generally to the production of sodium polyphosphates, and in particular to an anhydrous thermal process for producing sodium tripolyphosphate in substantially pure form with substantially 100% yield, and to a modification whereby, as desired, a predetermined content of tetrasodium pyrophosphate may accompany the sodium tripolyphosphate.

The soduim polyphosphates are considered as those salts having compositions lying in the system represented by $NaPO_3$ to $Na_4P_2O_7$, or in words, by sodium metaphosphate to tetrasodium pyrophosphate.

The extreme formulas defining the range are such that each of the extremes may be considered as dehydrated known salts. Thus, $NaPO_3$ may be considered as a dehydrated form of $NaH_2PO_4$; and $Na_4P_2O_7$ may be considered as a dehydrated form of $Na_2HPO_4$. In fact these respective monosodium orthophosphate and disodium orthophosphate salts may be dehydrated by thermal action to produce sodium metaphosphate ($NaPO_3$) and tetrasodium pyrophosphate ($Na_4P_2O_7$)

Within the polyphosphate system sodium tripolyphosphate has the formula . It does not correspond to any dehydrated known salt, and therefore, it is not known that it may be made by a comparable dehydrating reaction. However, it is known that it may be formed by a thermal reaction between two known compounds, as by the reaction:

(1) 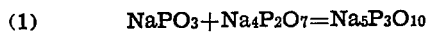

Since the factors of the above equation are dehydrated salts as stated above, the reaction may be given as:

(2) 

It has been known that said salts in the proportion of Reaction 2 may be heated to dryness, then thermally treated at more elevated temperature to form to some extent only a limited quantity of $Na_5P_3O_{10}$, unless very precise controls of tempering are practiced in which case excellent yields may be obtained. (See U. S. Patent No. 2,174,614.)

Sodium tripolyphosphate at elevated temperatures has characteristic reactions or behavior. It is a crystalline anhydrous product with two physical forms in the solid state below its decomposition temperature of about 625° C. There is a critical or transition temperature of about 500° C. below which a form stable from about 500° C. to 625° C. may be tempered to a form stable below about 500° C., and above which the latter form may be tempered back to the form which is stable from about 500° to 625° C.

At the temperature of about 625° C. sodium tripolyphosphate begins to decompose with the formation of a liquid phase (which is a eutectic mixture) and a solid phase (which is $Na_4P_2O_7$). At about 860° C., the solid phase disappears and a homogeneous melt appears. These reactions are all reversible in nature.

In cooling a homogeneous fusion mass corresponding in composition to the formula $Na_5P_3O_{10}$, but not necessarily being such, it is possible to derive various compositions which are mixtures of polyphosphates. There is a constant shift in composition, and by controlled cooling, then chilling, it is possible to obtain a high yield of

Such a process is costly in that high temperature must be attained in order to secure the homogeneous liquid fusion from which to start, and high temperature must be retained in the slow cooling process.

In attempts to avoid this, as by proceeding with materials and in proportion, as in Reaction 2 above, evaporating, and heating, but not to a fusion point, only small yields of $Na_5P_3O_{10}$ have been attained, and it has been contaminated with both $NaPO_3$ and $Na_4P_2O_7$, these being unreacted or reversion products of dehydration of the said factors of Reaction 2. The $NaPO_3$ may be present as a water insoluble form, and in large amount.

It is the object of the present invention to produce sodium tripolyphosphate in high yield, substantially free from any form of $NaPO_3$, and if desired, substantially free from $Na_4P_2O_7$ or containing the latter in predetermined amount.

Various other and ancillary objects and advantages of the invention will become apparent from the following description and explanation of the invention which is given in connection with the accompanying drawings in which:

Fig. 1 is a vertical longitudinal section of a cylindrical rotary furnace, in more or less diagrammatic representation.

Fig. 2 is a vertical cross-section of the furnace of Fig. 1, taken on the line 2—2 thereof.

Since difficulties have been experienced heretofore in processes aiming at the production of $Na_5P_3O_{10}$ by thermal reactions short of a temperature producing fusion, the reaction has been studied and the underlying cause of the low yield and the resulting impurities has been discovered, and remedied. It has been discovered that the physical state of aggregation in the evanescent mass undergoing thermal treatment is most important. The main reaction involves a redistribution of the oxides $Na_2O$ and $P_2O_5$ in the proportion of $5Na_2O$ and $3P_2O_5$. When the reacting oxides for a theoretical 100% yield are supplied according to Reactions 1 and 2 given above, as a result of which there are two groups, one having a ratio of $Na_2O$ to $P_2O_5$ of 1 to 1, and the other having a ratio of $Na_2O$ to $P_2O_5$ of 2 to 1, the latter group must yield some of its $Na_2O$ or must receive $P_2O_5$, or both actions occur together.

According to the present invention the integral bodies of these two groups are formed so as to have exceedingly minute size and to be so well mixed, that the effect of concentrating $Na_2O$ in one group, and of concentrating $P_2O_5$ in the other group, thereby isolating each from reaction, is substantially avoided. It has as yet been impossible to ascertain whether the particle sizes are microscopically visible, sub-microscopic, or substantially molecular in size. However, by the methods employed to produce the mixture, the fineness is such that the effects of coarseness of the mixture are avoided, these being low yield, and undesired $NaPO_3$ or undesired $Na_4P_2O_7$. The physical condition is expressed herein by the term "finely mixed." The condition may vary from intimate admixture to homogeneity.

According to the present invention a mixture of reacting salts or chemicals to provide $Na_2O$ and $P_2O_5$ in the desired proportion, in solution in water, is sprayed, or fed in a fine stream, or otherwise dispersed in fine liquid particles or small volumes, into or onto a very hot medium sufficient to flash-dry the solution and produce finely mixed ash or solid residue, preferably in fine particle sizes. The chemicals used are such as to provide only $Na_2O$ and $P_2O_5$ in the residue, in the desired proportion. In the solution other components of the chemicals employed may exist, but they must be such as to be volatilized away and not deposited in the residual solid salt mass, which latter ultimately consists analytically of from at least 5 to less than 6 moles of $Na_2O$ and 3 moles of $P_2O_5$. These components other than $Na_2O$ and $P_2O_5$ may be $H_2O$, $CO_2$ or $NH_3$, or radicals such as oxalates, citrates and like volatile or "combustible" radicals. The solid particles of residue maintain their integrity and internal distribution of $Na_2O$ and $P_2O_5$ in the proportion supplied by the liquid. Even though the particles may ball up or agglomerate, this is true. The solid residue, agglomerated or not, is then roasted at a suitable temperature below a fusion point of the mass at any time in the process, whereby the oxides combine in substantially 100% yield to form polyphosphate salts. Where the ratio of $Na_2O$ to $P_2O_5$ in the ash is 5 to 3, the yield is substantially 100% sodium tripolyphosphate. Where the proportion is 6 to 3, the end product would be $Na_4P_2O_7$, but this is outside and at the limit of the present invention, since merely dehydration of $Na_2HPO_4$ would produce it without interaction of molecules. Therefore, where the ratio of $Na_2O$ to $P_2O_5$ in the ash is at least 5 and less than 6 moles of $Na_2O$ to 3 moles of $P_2O_5$, the present invention may be practiced to secure a substantially 100% yield of $Na_5P_3O_{10}$ with a ratio of 5 to 3, and a predetermined mixture of $Na_5P_3O_{10}$ and $Na_4P_2O_7$ otherwise, in each case, without any substantial quantity of any form of $NaPO_3$.

In carrying out the invention a strong solution of mixed salts or other chemicals is provided such as to give only $Na_2O$ and $P_2O_5$ in solid salt residue, and to give the desired ratio of $Na_2O$ to $P_2O_5$.

The agents selected for dissolution may be two or more in number, and chosen in kind and quantity to produce the desired reactive salt mass which is infusible in the process, so as to effect reaction in the solid state. Where only two agents are used there must be one selected from a group of agents, herein designated group A, in which $P_2O_5$ exceeds $Na_2O$, if present, by more than 3 moles of $P_2O_5$ to 5 moles of $Na_2O$; and the other agent must be selected from a group of agents, herein designated group B, in which $Na_2O$ exceeds $P_2O_5$, if present, by more than 5 moles of $Na_2O$ to 3 moles of $P_2O_5$. The following listings show suitable water-soluble salts or agents for such groups:

| Group A | Group B |
|---|---|
| $NaH_2PO_4$ | $Na_2HPO_4$ |
| $NaH_3P_2O_7$ | $Na_3PO_4$ |
| $Na_2H_2P_2O_7$ | $Na_4P_2O_7$ |
| $Na_3HP_2O_7$ | $NaHCO_3$ |
| $NaPO_3$ | $Na_2CO_3$ |
| $P_2O_5$ | $NaOH$ |

However, it is to be understood that the invention is not limited to selection from groups A and B, nor are groups A and B limited to lists shown above. Extension of the lists, in view of the teachings herein made, will be obvious to those skilled in the art. It will also be obvious that extensions of the lists of available material, as to the combustible organic acid salts such as sodium oxalates, citrates, tartrates, or to the various ammonium phosphate salts, in general leads to the use of more expensive and more impractical agents.

Selected chemicals may be combined as in Reaction 1 whereby the dehydration has occurred prior to dissolving. They may be provided according to Reaction 2, whereby the dehydration of each is to be accomplished. For example, they may be provided to react as follows:

(3)  $NaPO_3 + 2Na_2HPO_4 = Na_5P_3O_{10} + H_2O$ or (4) 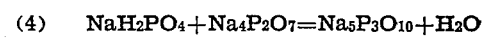 $NaH_2PO_4 + Na_4P_2O_7 = Na_5P_3O_{10} + H_2O$ It is preferred that they be provided as set forth in Reaction 2 from the commonplace orthophosphate salts, to be dehydrated in process. Such a solution is preferred with a strength at 50° Bé.

The desired solution is preferably used as a saturated one, to limit the amount of water to be evaporated. The strength of the solution will depend upon the selection of salts and the temperature at which it is held.

The solution may be sprayed upon a hot plate of 550° C., for example, where a small batch, as in a laboratory, is to be made. But in commercial operation a continuously operating furnace may be provided for the process. A suitable one is shown in the drawings.

Numeral 10 represents an inclined cylindrical rotary furnace with a slightly higher entry end 11 than discharge end 12. Oil or gas burners 13 on fuel line 14 at the entry end project hot flames downwardly toward the bottom interior. A solution feed line 15 parallels the fuel line and has nozzles 16, which introduce either a fine continuous stream, or which direct a mist of the solution, into the hot flame, thereby flash-drying it, and depositing particles of finely mixed solid residue to build up a bed of it designated 17.

An annular partition 19 divides the furnace into the flame section and the heating section, whereby a depth of bed 17 is created. Surplus material of the bed, as agglomerated particles, spills over the partition as the furnace is rotated and the material progresses through the roasting section 20 of the furnace as bed 21 to discharge end 12. A controlled current of air is passed through the furnace, as shown by arrows 22. The air stream is adjusted with respect to the burners in operation, to maintain the bed 17 at about 550° to 600° C., and to discharge material 21 and air at the end 12 at about 350° C. About one hour through the furnace suffices.

Under the conditions of the roasting process, where a preferred temperature in the range from 300° to 350° C. is used, any isolated monosodium orthophosphate of which the bed-forming content would remain isolated, would dehydrate to insoluble sodium metaphosphate. However, in the present invention there is no isolated monosodium orthophosphate of which the bed-forming content remains isolated. Such bed-forming content is intimately associated with other bed-forming content from material of the class of group B. The roasting effects reaction between the bed-forming content from group A and the bed-forming content from group B, thus preventing the formation of insoluble sodium metaphosphate from any monosodium orthophosphate or its equivalent which may be initially employed.

These temperatures assure dehydration or reaction, or both, in the preferred usage. After dehydration to effect an intimate mixture equivalent to at least one mole of $Na_4P_2O_7$ to one mole of $NaPO_3$, whatever the salts that are present, the reaction takes place slowly but appreciably where the roasting temperature is about 250° C., and it is fast where the roasting temperature is 300° C. However, it is preferred to use a roasting temperature of at least 300° C. but rather from 325° to 350° C. to insure complete and rapid reaction in the largest agglomerates. The temperature may be as high as 600° C., but there is no advantage economically.

The temperature where the solution is introduced is not critical for reaction purposes, but is such, depending upon the size and amount of spray particles being introduced, to effect a substantial flash-drying of the particles, whereby to avoid depositing liquid from which slow evaporation and fractional crystallization could occur.

Reference is made to my copending application Serial No. 549,747, filed August 16, 1944, as a continuation-in-part of the present application, wherein a distinctive result is achieved by a temperature control in a limited range within the broad range herein set forth and claimed.

Numerous changes and modifications in the process, as well as other apparatus, may be employed in carrying out the invention set forth in the appended claims.

I claim:

1. The method which comprises forming a solution in water of material providing at least 5 moles and less than 6 moles of $Na_2O$ and 3 of $P_2O_5$ and of a composition to provide the hereinafter-mentioned solid salt residue infusible at temperatures up to at least 600° C. which residue ultimately consists analytically of $Na_2O$ and $P_2O_5$ in the said proportion of said solution, finely dividing the solution, flash-drying the finely divided solution so as to provide said solid salt residue in finely mixed form, heating said residue at a temperature in the range from 250° to 600° C., whereby to form a crystalline salt mass containing units corresponding to $Na_5P_3O_{10}$ which mass is substantially free from $NaPO_3$ and containing $Na_4P_2O_7$ substantially in the amount necessitated by the content of $Na_2O$ in excess of said 5 moles.

2. The method which comprises forming a solution in water of salt having a content of $Na_2O$ and of $P_2O_5$ in the ratio of $1Na_2O$ to $1P_2O_5$, and other salt having a content of $Na_2O$ and $P_2O_5$ in the ratio of $2Na_2O$ to $1P_2O_5$, there being sufficient of said salts together providing at least 5 and less than 6 molecular weights of $Na_2O$ and 3 molecular weights of $P_2O_5$, said solution having a composition to provide the hereinafter-mentioned solid salt residue infusible at temperatures up to at least 600° C. which residue ultimately consists analytically of $Na_2O$ and $P_2O_5$ in the said proportion of said solution, finely dividing the solution, flash-drying the finely divided solution so as to provide said solid salt residue in finely mixed form, and heating said residue at a temperature in the range from 250° to 600° C., whereby to form a crystalline salt mass containing units corresponding to $Na_5P_3O_{10}$ from substantially all of the first-mentioned salt.

3. The method which comprises forming a solution in water of solute consisting of monosodium orthophosphate and of disodium orthophosphate, there being sufficient of each of the said two salts to provide at least 5 and less than 6 molecular weights of $Na_2O$ to each 3 molecular weights of $P_2O_5$; finely dividing the solution, flash-drying the finely divided solution so as to provide a solid salt residue in finely mixed form which is infusible at temperatures up to at least 600° C., and heating said residue at a temperature in the range from 250° to 600° C., whereby to form a crystalline salt mass containing units corresponding to $Na_5P_3O_{10}$ from substantially all of the first-mentioned salt.

4. The method which comprises forming a water solution of material providing at least 5 moles and less than 6 moles of $Na_2O$ and 3 moles of $P_2O_5$ and of a composition to provide the hereinafter-mentioned solid salt residue infusible at temperatures up to at least 600° C. which residue ultimately consists analytically of $Na_2O$ and $P_2O_5$ in the said proportion of said solution, flash-drying the solution by directing said solution in finely divided form through a flame-carrying atmosphere toward a heated bed of said solid salt residue so as to provide solid salt residue in finely mixed form as an addition to said bed, and thereafter heating the newly added material of said bed at a temperature in the range from 250° to 600° C., whereby to effect the reaction of the constituents thereof to a crystalline salt mass containing units corresponding to $Na_5P_3O_{10}$.

5. The method which comprises forming a solution in water of at least two materials together providing $Na_2O$ and $P_2O_5$ in the proportion of at least 5 and less than 6 moles of $Na_2O$ to 3 moles of $P_2O_5$ of which materials at least one contains in excess of 3 moles of $P_2O_5$ relative to a content of from 0 to 5 moles of $Na_2O$, said solution being of a composition to provide the hereinafter-mentioned solid salt residue infusible at temperatures up to at least 600° C. which residue ultimately consists analytically of $Na_2O$ and $P_2O_5$ in the said proportion of said solution, continuously directing said solution in finely divided form through a heated atmosphere toward a bed of such residue and thereby flash-drying the particles of the solution so as to provide said solid salt residue in finely mixed form and so as to add the resulting solid salt residue to said bed, said bed having a temperature in the range from 250° to 600° C., and continuously moving the material in said bed away from said depositing residue for discharge of material substantially at the rate of providing residue, and maintaining the temperature of said bed material below about 600° C.

6. The method which comprises forming a solution of a mixture of dissolved substances which mixture is capable of providing the hereinafter-mentioned solid salt residue infusible at temperatures up to at least 600° C. which residue ultimately consists analytically of 5 moles of $Na_2O$ and 3 moles of $P_2O_5$, continuously directing said solution in finely divided form through a heated atmosphere toward a bed of such residue and thereby flash-drying the particles of the solution so as to provide said solid salt residue in finely mixed form and so as to add the resulting solid salt residue to the said bed, said bed having a temperature in the range from 250° to 600° C., and continuously moving the material of said bed away from said depositing residue for discharge of material substantially at the rate of providing residue, and maintaining the temperature of said material below about 600° C.

7. The method which comprises forming a solution of a mixture of dissolved substances which mixture is capable of providing the hereinafter-mentioned solid salt residue infusible at temperatures up to at least 600° C. which residue ultimately consists analytically of at least 5 moles and less than 6 moles of $Na_2O$ and 3 moles of $P_2O_5$, continuously directing said solution in finely divided form through a heated atmosphere toward a bed of such residue and thereby flash-drying the particles of the solution so as to provide said solid salt residue in finely mixed form and so as to add the resulting solid salt residue to said bed, said bed having a temperature in the range from 250° to 600° C., and continuously moving the material of said bed away from said depositing residue for discharge of the material substantially at the rate of providing residue, and maintaining the temperature of said material below about 600° C.

8. In the process of forming sodium polyphosphate at temperatures not over 600° C., the steps which comprise forming a solution in water of a mixture of dissolved substances including at least one compound of $Na_2O$ and at least one different compound of $P_2O_5$ which mixture is capable of providing the hereinafter-mentioned solid salt residue infusible at temperatures up to at least 600° C. which residue ultimately consists analytically of 5 moles of $Na_2O$ and 3 moles of $P_2O_5$, and flash-drying said solution so as to provide said solid salt residue in finely mixed form, and heating said residue at a temperature in the range from 250° to 600° C., whereby the residue contents react to form sodium triphosphate.

9. The method which comprises forming a solution in water of solute consisting of monosodium orthophosphate and of disodium orthophosphate, there being sufficient of each of said two salts to provide at least 5 and less than 6 moles of $Na_2O$ to each 3 moles of $P_2O_5$, said solution being capable of providing the hereinafter-mentioned solid salt residue infusible at temperatures up to at least 600° C., continuously directing said solution in finely divided form through a heated atmosphere toward a bed of such residue and thereby flash-drying the particles of the solution so as to provide said solid salt residue in finely mixed form and so as to add the resulting solid residue to said bed, said bed having a temperature in the range from 250° to 600° C., and continuously moving the material in said bed away from said depositing residue for discharge of material substantially at the rate of providing residue, and maintaining the temperature of said bed of material below 600° C.

10. The method which comprises forming a solution in water of material providing 5 moles of $Na_2O$ and 3 moles of $P_2O_5$ and of a composition to provide the hereinafter-mentioned solid salt residue infusible at temperatures up to at least 600° C. which residue ultimately consists analytically of 5 moles of $Na_2O$ and 3 moles of $P_2O_5$, finely dividing the solution, flash-drying the finely divided solution so as to provide said solid salt residue in finely mixed form, and heating the residue at a temperature in the range from 250° to 600° C., whereby to form a crystalline salt mass consisting of units corresponding to $Na_5P_3O_{10}$ which mass is substantially free from $NaPO_3$.

11. The method which comprises forming a solution in water of salt having a content of $Na_2O$ and of $P_2O_5$ in the ratio of $1Na_2O$ to $1P_2O_5$, and other salt having a content of $Na_2O$ and $P_2O_5$ in the ratio of $2Na_2O$ and $1P_2O_5$, said salts together providing 5 moles of $Na_2O$ and 3 moles of $P_2O_5$, said solution having a composition to provide the hereinafter-mentioned solid salt residue infusible at temperatures up to at least 600° C. which residue ultimately consists of 5 moles of $Na_2O$ and 3 moles of $P_2O_5$, finely dividing the solution, flash-drying the finely divided solution so as to provide said solid salt residue in finely mixed form, and heating the residue at a temperature in the range from 250° to 600° C., whereby to form a crystalline salt mass consisting of units corresponding to $Na_5P_3O_{10}$ which mass is substantially free from sodium metaphosphate.

12. The method which comprises forming a solution in water of solute consisting of monosodium orthophosphate and of disodium orthophosphate, there being sufficient of each of the said two salts to provide 5 moles of $Na_2O$ to 3 moles of $P_2O_5$; finely dividing the solution, flash-drying the finely divided solution so as to provide solid salt residue in finely mixed form which is infusible at temperatures up to at least 600° C., and heating said residue at a temperature in the range from 250° to 600° C., whereby to form a crystalline salt mass consisting of units corresponding to $Na_5P_3O_{10}$ which mass is substantially free from sodium metaphosphate.

13. The method which comprises forming a solution in water of at least two materials together providing 5 moles of $Na_2O$ and 3 moles of $P_2O_5$ of which materials at least one contains in excess of 3 moles of $P_2O_5$ relative to a content of from 0 to 5 moles of $Na_2O$, said solution being of a composition to provide the hereinafter-mentioned solid salt residue infusible at temperatures up to at least 600° C. which residue ultimately consists analytically of 5 moles of $Na_2O$ and 3 moles of $P_2O_5$, finely dividing the solution; flash-drying the finely divided solution so as to provide said solid salt residue in finely mixed form, and heating said residue at a temperature in the range from 250° to 600° C., whereby to form a crystalline salt mass consisting of units corresponding to $Na_5P_3O_{10}$ which mass is substantially free from $NaPO_3$.

14. The method which comprises forming a water solution of material providing 5 moles of $Na_2O$ and 3 moles of $P_2O_5$ and of a composition to provide the hereinafter-mentioned solid salt residue infusible at temperatures up to at least 600° C. which residue ultimately consists analytically of 5 moles of $Na_2O$ and 3 moles of $P_2O_5$, flash-drying said solution by directing said solution in finely divided form through a flame-carrying atmosphere toward a heated bed of said solid residue so as to provide solid salt residue in finely mixed form as an addition to said bed, and thereafter heating the newly added material of said bed at a temperature in the range from 250° to 600° C., whereby to effect reaction of the constituents thereof to a crystalline salt mass consisting of units corresponding to $Na_5P_3O_{10}$.

15. The method which comprises forming a solution in water of at least two materials together providing 5 moles of $Na_2O$ and 3 moles of $P_2O_5$ of which materials at least one contains in excess of 3 moles of $P_2O_5$ relative to a content of from 0 to 5 moles of $Na_2O$, said solution being of a composition to provide the hereinafter-mentioned solid salt residue infusible at temperatures up to at least 600° C. which residue ultimately consists analytically of 5 moles of $Na_2O$ and 3 moles of $P_2O_5$, continuously directing said solution in finely divided form through a heated atmosphere toward a bed of such residue and thereby flash-drying the particles of the solution so as to provide said solid salt residue in finely mixed form and so as to add the resulting solid residue to said bed, said bed having a temperature in the range from 250° to 600° C., and continuously moving the material away from said depositing residue for discharge of material substantially at the rate of providing said residue, and maintaining the temperature of said bed material below about 600° C.

16. In the process of forming sodium polyphosphate at temperatures not over 600° C., the steps which comprise forming a solution in water of a mixture of dissolved substances including at least one compound of $Na_2O$ and at least one different compound of $P_2O_5$ which mixture is capable of providing the hereinafter-mentioned solid salt residue infusible at temperatures up to at least 600° C. which residue ultimately consists analytically of at least 5 moles and less than 6 moles of $Na_2O$ and 3 moles of $P_2O_5$, and flash-drying said solution so as to provide said solid salt residue in finely mixed form, and heating said residue at a temperature in the range from 250° to 600° C., whereby the residue contents react to form sodium triphosphate.

17. The method which comprises forming a solution in water of solute consisting of monosodium orthophosphate and of disodium orthophosphate, there being sufficient of each of said two salts to provide 5 moles of $Na_2O$ and 3 moles of $P_2O_5$, said solution being capable of providing the hereinafter-mentioned solid salt residue infusible at temperatures up to at least 600° C., continuously directing said solution in finely divided form through a heated atmosphere toward a bed of such residue and thereby flash-drying the particles of the solution so as to provide said solid salt residue in finely mixed form and so as to add the resulting solid salt residue to said bed, said bed having a temperature in the range from 250° to 600° C., and continuously moving the material in said bed away from said depositing residue for discharge of material substantially at the rate of providing residue, and maintaining the temperature of said bed of material below 600° C.

18. The method which comprises forming a solution in water of at least two materials together providing $Na_2O$ and $P_2O_5$ in the proportion of at least 5 and less than 6 moles of $Na_2O$ to 3 moles of $P_2O_5$ of which materials at least one contains in excess of 3 moles of $P_2O_5$ relative to a content of from 0 to 5 moles of $Na_2O$, said solution being of a composition to provide the hereinafter-mentioned solid salt residue infusible at temperatures up to at least 600° C. which residue ultimately consists analytically of $Na_2O$ and $P_2O_5$ in the said proportion of said solution, finely dividing the solution; flash-drying the finely divided solution so as to provide said solid salt residue in finely mixed form, and heating the said residue at a temperature in the range from 250° to 600° C., whereby to form a crystalline salt mass containing units corresponding to $Na_5P_3O_{10}$ which mass is substantially free from $NaPO_3$ and containing $Na_4P_2O_7$ substantially in the amount necessitated by the content of $Na_2O$ in excess of said 5 moles.

CHARLES S. KING.

REFERENCES CITED

The following references are of record in the file of this patent:

UNITED STATES PATENTS

| Number | Name | Date |
|---|---|---|
| 2,182,357 | Schwartz | Dec. 5, 1939 |
| 2,046,841 | Preisman | July 7, 1936 |
| 1,689,697 | Thornton | Oct. 30, 1928 |
| 2,174,614 | Bornemann | Oct. 3, 1939 |

FOREIGN PATENTS

| Number | Country | Date |
|---|---|---|
| 441,474 | British | Jan. 20, 1936 |
| 649,757 | Germany | Aug. 19, 1937 |